United States Patent Office 3,408,371
Patented Oct. 29, 1968

3,408,371
ESTERIFICATION OF 17α-ETHINYL-17β-HYDROXY STEROIDS
Otto Halpern, Palo Alto, Calif., assignor to Syntex Corporation, Panama, Panama, a corporation of Panama
No Drawing. Filed June 16, 1966, Ser. No. 557,885
10 Claims. (Cl. 260—397.4)

This invention relates to a new and novel process for the esterification of cyclopentanophenanthrene derivatives.

Many of the esterified hydroxy steroids of the androstane and estrane series are recognized to be of therapeutic value, including the esterified steroids with free keto groups. For example, 17α-ethynyl-17β-acetoxyestr-4-en-3-one has been shown to be an effective progrestational agent, and 17β-propoxyandrost-4-en-3-one has been shown to be an effective androgenic and anabolic agent.

Hydroxy steroids are generally esterified with the assistance of a catalyst. The primary and secondary hydroxy groups can be esterified in the presence of an acid catalyst, such as hydrogen chloride, or a basic catalyst, such as pyridine; but tertiary hydroxy groups are generally only esterifiable in the presence of an acid catalyst. However, under such conditions, enolizable keto groups are also esterified. Hence, when an esterified tertiary hydroxy steroid with free keto groups is desired, a selective hydrolysis of the enol ester is required subsequent to the esterification. For example, the preparation of 17β-acetoxy-17α-methylestr-4-en-3-one requires two steps: first, 17β-hydroxy-17α-methylestr-4-en-3-one is esterified with acetic anhydride in the presence of an acid catalyst, such as p-toluenesulfonic acid, and second, the resulting 3,17β-diacetoxy-17α-methylestra-3,5-diene is selectively hydrolyzed to yield the desired product.

The process of the present invention permits the complete esterification of hydroxy steroids without the necessity of using a catalyst. And, further, by practicing the procedure of the present invention, the acyloxy esters of hydroxy steroids are prepared directly without the formation of enol esters. For example, 17β-acetoxy-17α-ethynyl-estr-4-en-3-one is prepared directly from 17β-hydroxy-17-ethynylestr-3-en-3-one in one step. Another outstanding feature of this process is that it permits complete esterification in high yields, e.g., yields of 90% or more.

It is to be understood that for purposes of the present invention, acid anhydrides are the homologous, simple anhydrides of hydrocarbon carboxylic acids, the acyl groups of which will contain less than 12 carbon atoms and have a straight, branched, cyclic or cyclic-aliphatic chain structure. This structure may be saturated, unsaturated, or aromatic, and optionally substituted by functional groups, such as alkyloxy containing up to 5 carbon atoms, halogeno, and the like. Typical anhydrides thus include: acetic, propionic, enanthic, caproic, trimethylacetic, t-butylacetic, cyclopentylpropionic, β-chloropropionic, dichloroacetic anhydride, and the like.

The process, as said above, requires no catalyst. In fact, for the process to be effective, the reaction mixture must be substantially free of any acid, such as mineral acids like sulfuric acid, or halogen acids like hydrochloric acids, or carboxylic acids like acetic acid, or sulfonic acids like p-toluenesulfonic acid, or the like. For this reason, the acid anhydride used in this reaction must be substantially free of acids. The acid anhydrides can be purified by conventional techniques, such as fractional distillation. If a technical grade of acid anhydride is to be used, the acid anhydride should first be distilled from sodium acetate to remove any minerals or halogens present, then the technical grade acid anhydride is fractionally distilled if necessary.

The process of the present invention comprises treating the hydroxy steroid with at least a 5-molar excess, and preferably about a 25 to about a 100-molar excess per hydroxy group, of the appropriate acid anhydride; larger excesses of acid anhydride are practical and can also be used if desired. Optionally, a nonaqueous, inert, organic solvent is used in conjunciton with the acid anhydride in amounts of about one-half to about twice the volume of the acid anhydride used. The use of the inert solvent can be foregone if desired, as the process is equally efficient using either the acid anhydride alone or in conjunction with an inert solvent.

The resulting mixture, which is composed of the steroid, the reagent, and optionally the solvent, is heated so as to permit removal of some of the mixture by distillation. The mixture is distilled off at a rate equal to about 1% to about 25%, and preferably about 2% to about 10%, of the original reaction mixture volume per hour. However, the rate must be at least such that any acid that is formed during the reaction is substantially removed by distillation as rapidly as it is formed. The distillation is continued for a period of time ranging from about 1 to about 48 hours or longer. The period of distillation will vary, dependent on various factors such as the difficulty of the particular esterification, the particular acid anhydride used, the particular inert solvent, if any, that is used, the particular steroid being esterified, and so forth.

If the distillation is vigorous and rapid, or continued for a prolonged period of time, additional amounts of acid anhydride and/or solvent can be added during the course of the distillation to maintain the reaction volume. The isolation, purification and yield of the esterified steroid are improved if the reaction volume is maintained at least at one-third of its total initial volume, preferably at more than one-half of the total initial volume.

Any nonaqueous, inert, organic solvent or combinations of such solvents can be used in this process, but the solvent employed is generally selected so as to have a lower boiling point or range than that of the acid anhydride, and preferably the solvent will have a boiling point or range above that of any carboxylic acid that will be formed during the reaction. Typical examples of such solvents are: benzene, toluene, xylenes, cymenes, cumenes, durene, hexanes, decanes, dioxane, cyclohexane, naphthalene, 1-methylnaphthalene, and so forth. Any of these solvents can be combined to form an organic solvent system, e.g., a xylene solvent composed of ortho, meta and para-xylenes, or an aromatic solvent composed of benzene and toluene in any proportions.

At the completion of the process, the steroid is isolated and purified according to conventional techniques. For example, ice water is added to the cooled reaction mixture to decompose the excess anhydride, and the mixture is steam distilled to remove the solvent. The ester steroid may then be isolated by salting it out with the addition of an inorganic salt and collected by filtration. It is then dissolved in an inert, organic solvent which is nonmiscible with water, and washed with an aqueous basic solution and with water to neutrality. The solution is dried and evaporated to dryness to yield the esterified steroid. If necessary, the steroid can be further purified by conventional techniques, such as chromatography, recrystallization, and so forth.

Typical hydroxy steroids that can be completely esterified by this process are:

17β-hydroxyandrost-4-en-3-one,
17β-hydroxyestr-4-en-3-one,
17β-hydroxy-17α-ethynylestr-4-en-3-one,
10β,17β-dihydroxyandrost-4-en-3-one,
3β,17β-dihydroxyestra-1,3,5(10)-triene,
3β,16β,17β-trihydroxyestra-1,3,5(10)-triene,
6α-methyl-17α-ethynyl-17β-hydroxyestr-4-en-3-one,
6-chloro-17α-ethynyl-17β-hydroxyestra-4,6-dien-3-one, 17α-ethynyl-17β-hydroxyestr-5(10)-en-3-one,
2α,3α-isopropyliden-17α-ethynyl-17β-hydroxyestrane,
17α-ethynyl-17β-hydroxyandrost-4-ene,
17α-ethynyl-17β-hydroxyestr-4-ene,
17α-ethynyl-17β-hydroxyandrost-4-en-3-one,
and so forth. Of the hydroxy steroids, the 17-hydroxy-17-ethynyl steroids of the androstane and estrane series are the preferred starting materials for this process.

In order that those skilled in the art will more fully understand the process of the present invention, the following examples are provided as illustrations. In no way are these examples to be construed as limitations of the present invention.

EXAMPLE 1

One-hundred grams of 17α-ethynyl-17β-hydroxyestr-4-en-3-one are added to a solution of 1 l. of xylene and 1 l. of acetic anhydride. The resulting mixture is distilled at such a rate so as 450 ml. of distillate will be collected within a period of 8 hours. The remaining reaction mixture is added to 3 l. of water and the resulting mixture is steam distilled until no more xylene is removed. Sodium chloride is added and the material that is salted out is collected by filtration. The filtered solid is dissolved in ethyl acetate and washed with an aqueous solution of sodium bicarbonate and water to neutrality. The ethyl acetate solution is dried and evaporated to dryness to give 17α-ethynyl-17β-acetoxyestr-4-en-3-one. The melting point range is 163–164° C. and the actual yield is 96% of theoretical yield.

EXAMPLE 2

By using the same procedure as described in Example 1, but using 17α-ethynyl-17β-hydroxyandrost-4-en-3-one as the starting hydroxy steroid, 17α-ethynyl-17β-acetoxyandrost-4-en-3-one is formed.

EXAMPLE 3

To a solution consisting of 500 ml. of xylene and 500 ml. of acetic anhydride, 10 g. of 17α-ethynyl-17β-hydroxyestr-5(10)-en-3-one is added. The mixture is distilled for 12 hours at such a rate so as 25 ml. of distillate are distilled over per hour. At the completion of distillation, 2 l. of ice water are cautiously added to the cooled reaction mixture, and the resulting mixture is steam distilled until substantially all the xylene has been removed. The solid that forms upon the addition of sodium chloride is collected by filtration, washed with water, then dissolved in a liter of methylene chloride. The resulting mixture is washed with an aqueous solution of sodium carbonate and water to neutrality, dried and evaporated to dryness, yielding 17α-ethynyl-17β-acetoxyestr-5(10)-en-3-one.

EXAMPLE 4

One gram of 6-chloro-17α-ethynyl-17β-hydroxyestra-4,6-dien-3-one is added to a solution consisting of 10 ml. of xylene and 10 ml. of acetic anhydride. The solution is heated and distilled for 8 hours; during this period, 8 ml. of distillate is collected. At the completion of the reaction the mixture is added to 20 ml. of water. This mixture is extracted with methylene chloride, and these extracts are washed with an aqueous solution of potassium bicarbonate and water to neutrality, dried and evaporated to dryness to yield 6-chloro-17α-ethynyl-17β-acetoxyestra-4,6-dien-3-one.

EXAMPLE 5

Using the same procedure as set forth in Example 4, but utilizing 18 ml. of caproic anhydride in place of 10 ml. of acetic anhydride and using 25 g. of naphthalene in place of 10 ml. of xylene, 6-chloro-17α-ethynyl-17β-caproxyestra-6-dien-3-one is formed.

EXAMPLE 6

Using the same procedure as described in Example 4, but replacing the 10 ml. of acetic anhydride with 15 ml. of propionic anhydride and replacing the 10 ml. of xylene with 10 ml. of cumene and using 6α-methyl-17α-ethylnyl-17β-hydroxyestr-4-en-3-one as the starting hydroxy steroid, 6α - methyl - 17α - ethynyl - 17β - propionoxyestr - 4 - en-3-one is formed.

EXAMPLE 7

Three thousand and twenty grams of 17α-ethynyl-17β-hydroxyestr-4-en-3-one are added to a solution consisting of 50 l. of xylene and 50 l. of acetic anhydride. The resulting mixture is heated and 10 l. of the mixture are distilled off hourly. After 4 hours of distillation, the reaction mixture is replenished with hourly additions of 5 l. of xylene and 5 l. of acetic anhydride. The distillation is continued for another 7 hours. One-hundred and twenty liters of water are added to the cooled mixture, and the mixture is then steam distilled until all the xylene has been removed from the mixture. The steroid is salted out with the addition of sodium chloride; the solid steroid is filtered off and washed with water. The solid is placed in methylene chloride and washed with aqueous sodium carbonate and water to neutrality, dried, and evaporated to dryness to yield 17α-ethylnyl-17β-acetoxyestr-4-en-3-one.

What is claimed is:

1. A process for the esterification of 17β-hydroxy-17α-ethynyl steroids which comprises treating the steroid with at least a 5-molar excess of an anhydride of a hydrocarbon carboxylic acid at a temperature sufficient to permit removal by distillation of the acid that is formed.

2. The process according to claim 1 wherein the steroid is treated with about a 25 to about a 100-molar excess of an anhydride of a hydrocarbon carboxylic acid.

3. The process according to claim 1 wherein the compound is treated with an anhydride of a hydrocarbon carboxylic acid in an inert media whose volume is about one-half to about twice the volume of the acid anhydride used.

4. The process according to claim 1 wherein the distillation rate is from about 1% to about 10% of the initial reaction mixture volume per hour.

5. The process according to claim 1 wherein the distillation rate is sufficient to remove any carboxylic acid formed during the process as rapidly as it is formed.

6. The process according to claim 1 wherein the hydrocarbon carboxylic acid anhydride is selected from a group consisting of acetic anhydride, propionic anhydride, and caproic anhydride.

7. The process according to claim 1 wherein the compounds are 17α-ethynyl-17β-hydroxy steroids of the androstane and estrane series.

8. The process according to claim 1 wherein the 17β-hydroxy-17α-ethynyl steroids are treated in the absence of any acid with about a 25 to about a 100-molar excess of an anhydride of a hydrocarbon carboxylic acid in an inert media having a volume of about one-half to about twice that of the hydrocarbon carboxylic acid anhydride used, while continuously distilling off some of the reaction mixture at a sufficient rate so as to substantially all carboxylic acid is removed as rapidly as it is formed in the reaction mixture.

9. The process according to claim 1 wherein the 17β-hydroxy-17α-ethynyl steroid is 17α-ethynyl-17β-hydroxyestr-4-en-3-one.

10. The process according to claim 1 wherein the 17β-hydroxy-17α-ethynyl steroid is 17α-ethynyl-17β-hydroxyestr-5(10)-en-3-one.

References Cited

UNITED STATES PATENTS 2,838,500   6/1958   Campbell et al. ____ 260—239.55

LEWIS GOTTS, *Primary Examiner.*

E. G. LOVE, *Assistant Examiner.*